United States Patent Office 2,746,486
Patented May 22, 1956

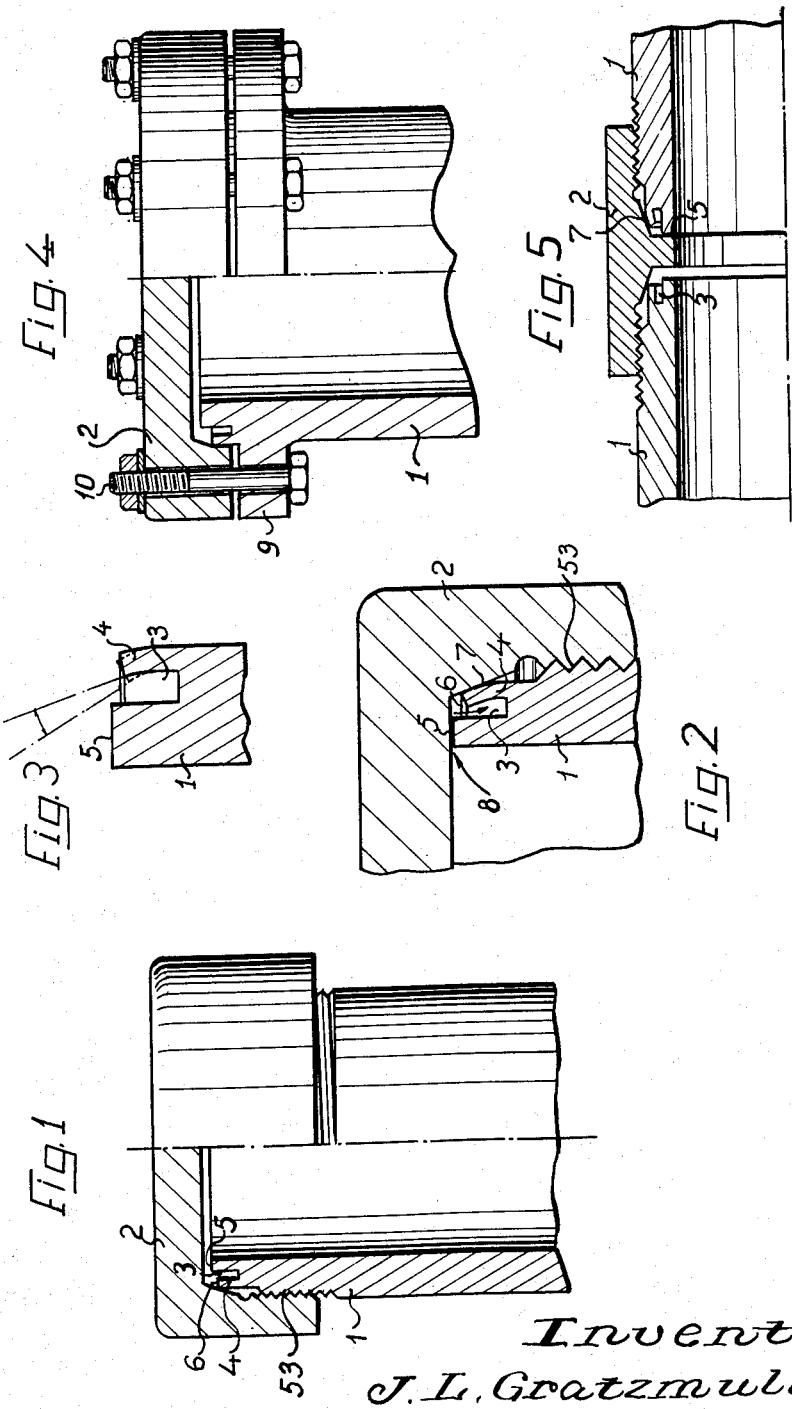

2,746,486

FLUID-TIGHT ASSEMBLY

Jean Louis Gratzmuller, Paris, France

Application January 13, 1953, Serial No. 331,017

Claims priority, application France January 23, 1952

6 Claims. (Cl. 138—89)

This invention relates to means for providing a fluid-tight seal directly between two elements of an assembly and more particularly between one end of a cylindrical pressure-fluid container and a closing head for said container end.

The main object of the invention is to ensure tightness between such two elements by establishing an uninterrupted contact under pressure directly between two coaxial surfaces, each of which is provided on one of said elements, said contact being established and maintained by the mere assembling of said elements.

For this purpose, according to the invention, a radially elastically deformable annular lip or longitudinally extending flange is formed on one of the elements and a conical seat is formed on the other, said lip and seat being so designed that the assembling of the elements determines a coaxial relative displacement between said seat and lip thus causing radial deformation of the latter.

With this arrangement said deformation creates, between said lip and seat, a permanent elastic pressure contact sufficient to establish a fluid-tight seal therebetween and, thence, between the two assembly elements.

Another object of the invention is to limit the above mentioned radial deformation of said elastic lip.

For this purpose there is provided, according to another feature of the invention, respective cooperating abutment means on the assembly elements, said lip, seat and abutment means being so related as to limit the coaxial relative displacement between said lip and seat to a predetermined extent.

The sealing arrangement according to the invention has the essential advantage of avoiding the use of any intervening packing means between the two assembled elements.

A further advantage is that no accurate machining of the elements is required since the contact between the annular lip and its conical seat is automatically adjusted upon deformation of said lip as the elements are assembled together. In other words, the deformation of the lip or flange conforms the concentricity of the same to that of the conical seat thereby compensating for lack of concentricity between the elements.

Still another advantage is that a convenient pressure of contact between the lip and its seat can be obtained with a comparatively small axial assembling force.

A further object of the invention is to use the fluid-pressure against which the elements are made tight to increase the sealing contact pressure.

For this purpose, the above mentioned conical seat is preferably so related with said annular lip that the deformation of the same is directed towards the side on which the fluid-pressure is present upon assembling of the elements, whereby said fluid pressure presses said lip upon said conical seat.

In one embodiment of the invention, an annular groove is provided in one terminal edge of a tubular element so that the outer wall of said groove constitutes the desired radially deformable elastic lip, the axial length of said lip being moreover reduced so that the remaining inner portion of said edge constitutes an axial abutment for the other element.

This arrangement has the additional advantage that the inner cylindrical surface of said tubular element is in no way modified.

In another embodiment of the invention, an annular step is provided around the outer periphery of such a terminal edge, so that the remaining portion of said edge constitutes the desired radially deformable elastic lip, while the annular bottom of said step constitutes an axial abutment.

This embodiment has the advantage that the axial position of said abutment may be selected at will.

The two main elements of a fluid-tight assembly according to the invention may be held in assembled condition by any suitable means within the scope of the invention, the only condition required being that the assembling of the elements determines a sufficient coaxial relative displacement between the above mentioned elastic lip and conical seat.

However, the invention is particularly interesting when the elements are assembled by respective cooperating means integral with the elements, such as threadings. In this case the whole tight assembly effectively comprises two elements only.

The invention is advantageously used in oleopneumatic accumulators, for example of the type described in my United States Patent No. 2,724,412 dated November 22, 1955, and entitled Hydropneumatic Accumulator for ensuring tightness of the end of the accumulator.

In an embodiment of the invention particularly adapted to be used in such accumulators, a threading adapted to receive a threaded closing head is formed on a terminal portion of reduced outer diameter of the cylinder and the radial shoulder connecting said portion with the rest of the cylinder is used as an axial abutment for the closing head.

Other objects and advantages of the invention will be apparent from the following detailed description, together with the accompanying drawings, submitted for purposes of illustration, reference being had for that purpose to the subjoined claims.

In the drawings:

Figure 1 is a half elevational, half axial-sectional view of one end of a cylindrical pressure-fluid container on which is screwed a closing head, this figure showing the lip before its deformation.

Figure 2 is an enlarged partial view showing the head screwed home and the lip completely deformed.

Figure 3 is a detail view of the lip after its deformation and after removal of the head.

Figure 4 is a view similar to Figure 1 showing a container of the same type but in which the head is secured on a flange by means of bolts and Figure 5 shows an application of the invention to pipe joining.

A fluid-tight assembly according to the invention essentially comprises a radially, elastically deformable lip or what can be termed a longitudinally extending flange 4 formed on one of the elements to be assembled and a conical seat 7 provided on the other element and coaxial with said lip when the two elements are assembled, the mere assembling of the elements determining a coaxial relative displacement between said seat 7 and lip 4 whereby the latter is deformed and tightly applied against seat 7, said displacement and thence said deformation being preferably limited by suitable mutual abutment surfaces.

Referring first to Figures 1 to 3 there is shown at 1 a tubular container end and at 2 a closing head screwed on said end as shown at 53. In this embodiment there is provided in the terminal edge of element 1 an annular groove 3, whereby an elastic lip 4 or longitudinally extending flange is formed on the outer periphery of said edge. Said lip is so shortened as to provide a difference of level between its own edge 6 and the terminal end of the inner lip or flange 5 of the terminal edge of container 1. The terminal end of lip or flange 5 constitutes an axial abutment for cooperation with the bottom of head 2. In other words, the cutting of the groove in the end of the inner member provides two annular concentric, longitudinally extending lips or flanges projecting forwardly or extending from the base of the groove which can thus be termed an inner annular end face of the inner member. The outer flange is elastically deformable and has substantially equal thickness throughout substantially its length and is shorter and thinner than the inner flange. The terminal end of the inner flange defines a contact surface and the beveled or conical surface 7 of the closure head extends across the line of movement of the outer flange 4 relative to the head when the members are moved relatively toward one another. The base or bottom of the head 2 forms a contact surface complementary to the contact surface on the terminal end of the inner flange 5. Thus, when head 2 is screwed home on the tubular element 1, as shown in Figure 2, lip 4 is deformed radially and inwardly to an extent which is determined by the above mentioned level difference between the terminal edges 5 and 6 considered at rest, by the conicity of wall 7 and its relative arrangement with respect to lip 4.

As shown in Figure 3, the deformation of lip or flange 4 is such that, when head 2 is screwed home, said lip 4 assumes the shape shown in dot lines. After removal of head 2, lip 4 does not resume its original shape. On the contrary, said lip 4 keeps a permanent deformation, such as shown in full line in Figure 3. Thus it may be seen that lip 4 has a partially elastic deformation comprised between the two positions shown in Figure 3 which holds it in permanent contact with conical seat 7. With this arrangement, any pressure fluid which is brought to groove 3 from the inner space 8 of the container, as shown by arrow 8 in Figure 2, increases the tightness, since it acts upon lip 4, so that the same is more strongly pressed upon conical seat 7. In other words, when the head 2 is moved relative to the container 1, the outer flange 4 is initially subjected to radial inward bending to an intermediate permanently deformed position shown in full lines in Figure 3, sufficient to conform the concentricity of the flange to that of the beveled or conical wall 7. Further axial movement of the head engages the contact surface on the end of the inner flange 5 with the bottom or complementary contact surface on the head 2 and subjects the outer flange to a further elastic deformation to form a sealed joint. When the head is removed, the outer flange moves from the dotted line position of Figure 3 back to the full line position in said figure.

In the alternative embodiment of Figure 4, the head 2 is sealed on the container through the same means as in Figures 1 to 3, but the head 2, instead of being screwed, on element 1, is secured on a flange 9 of element 1 by means of bolts and nuts 10.

Figure 5 shows the application of the same embodiment between a pipe union 2 and pipe ends 1, 1.

It may be seen that, in the embodiments of Figures 1 to 5, the inner cylindrical surface of element 1 is in no way modified by the presence of the sealing arrangement according to the invention.

It is therefore clear that the specific application of this invention as embodied in Figures 1 to 3 discloses a pressure fluid container end assembly that comprises an externally threaded tubular container end and a closing head having a frusto-conical bottom and an internally threaded arrangement adapted to permit the head to be screwed onto the tubular end of the container. There is an annular groove formed in the edge of the container defining inner and outer longitudinally extending lips or flanges. The outer flange has substantially equal thickness throughout substantially its length and is shorter and thinner than the inner flange. In other words, the outer flange, as shown, the outer flange in cross section in a radial plane passing through the end of the container from above the base of the groove exhibits a rectangular shape. Thus the axial extent or length of the outer flange is greater than its radial thickness. The frusto-conical bottom and the outer flange are so designed and related to one another that screwing of the closing head tightly on the tubular container end determines a limited co-axial displacement between the frusto-conical bottom and the outer flange and thus a predetermined radially inward elastic deformation of the outer flange so that a fluid-tight seal is established directly between the tubular end of the container and the closing head.

The invention further includes other means besides interengaging threads, such as, the bolt and nut means of Figure 4 for coupling the members 1 and 2 together upon moving at least one of the members at least axially relative to the other. In the Figure 4 arrangement, the flange 9 is an external laterally extending flange formed on the container a distance inwardly from the edge of the container, and the closing head has a series of bolt receiving apertures attached for alignment with similar apertures in the flange 9.

In the Figure 5 arrangement, the invention is applied to a pipe union assembly which includes two externally threaded pipe ends and an internally threaded pipe union or sleeve into which the respective pipes are screwed. An abutment surface comprising an inwardly extending annular flange is provided on the interior of the union and beveled or conical seat portions are provided on the interior of the union adjacent the abutment surface whereby when the pipe ends are screwed into the union the contact faces on the ends of inner flanges 5 engage the respective sides of the inwardly extending flange or abutment surface on the union and the outer flanges on the ends of the pipes are deformed radially inwards by the conical seating surfaces. In Figure 5 the pipe on the right hand side of the Figure is illustrated in its final sealed position while the pipe on the left hand side of the figure is illustrated prior to its being screwed tightly into the union.

It is, therefore, clear that the invention provides a seating surface cooperable with the outer flange and an abutment surface cooperable with the inner flange which limits the relative axial movement between the members and establishes a predetermined deformation of the outer flange whereby when the one member is moved axially relative to the other, the outer flange is initially subjected to a radial inward bending to an intermediate permanently deformed position sufficient to conform the concentricity of the flange to that of the beveled sealing surface and further axial movement engages the contact surface on the end of the inner flange with the contact surface or abutment on the other member and this further axial movement subjects the outer flange to a further elastic deformation. The relative movement between the members and the radial inward movement of the outer flange thus forming a sealed joint.

What is claimed is:

1. A pressure fluid container end assembly comprising a threaded tubular container end, a closing head having a frusto-conical bottom and adapted to be screwed on said threaded tubular end, an annular groove formed in the edge of said tubular end defining inner and outer longitudinally extending flanges, the outer flange having substantially equal thickness throughout substantially its length, said outer flange being shorter than the inner flange and having a radial thickness less than its axial length, said frusto-conical bottom and said outer flange being so designed and related to each other that screwing of said closing head tightly on said tubular end determines a limited coaxial relative displacement between said frusto-conical bottom and said outer flange, and, thus, a predetermined radially inwards elastic deformation of the said outer flange, whereby a fluid-tight seal is established directly between said container tubular end and closing head and whereby any fluid pressure in said container tends to press said outer flange against the frusto-conical surface of said bottom.

2. A pressure fluid container end assembly comprising a tubular container end, a flange on said tubular end located axially at a distance from the edge of said tubular end, a closing head having a frusto-conical bottom, a plurality of bolts to secure said closing head on said flange, an annular groove formed in said edge defining inner and outer longitudinally extending flanges, the outer flanges having substantially equal thickness throughout substantially its length, said outer flange being shorter than the inner flange and having a radial thickness less than its axial length, said frusto-conical bottom and outer flange being so designed and related to each other that screwing of said closing head on said flange by means of said bolts determines a limited co-axial relative displacement between said frusto-conical bottom and said outer flange and, thus, a predetermined radially inward elastic deformation of said outer flange, whereby a fluid-tight seal is established directly between said container tubular end and closing head and whereby any fluid pressure in said container tends to press said outer flange against the frusto-conical surface of said bottom.

3. A pipe union assembly comprising two threaded pipe ends, a threaded pipe union adapted to receive said pipe ends in threaded engagement to hold the same in coaxial assembled relation, an annular groove formed in the edge of each one of said pipe ends defining inner and outer longitudinally extending flanges, the outer flanges having substantially equal thickness throughout substantially its length, said outer flange being shorter than the inner flange and having a radial thickness less than its axial length, conical seats on said union for cooperation with each one of said outer flanges and axial abutment surfaces on said union each to cooperate with the edge of one of said inner flanges, said conical seats, outer flanges, inner flange edges, and abutment surfaces being so located and related to each other that screwing of said pipe ends tightly in said pipe union determines a limited co-axial relative displacement between each one of said outer flanges and its conical seat and, thus, a predetermined radially inwards elastic deformation of each one of said outer flanges, whereby a fluid-tight seal is established directly between each one of said pipe ends and said pipe union and, thus, between said pipe ends and whereby any fluid pressure in said pipe ends tends to press said outer flanges each against its seat.

4. Sealing arrangement for interfitting inner and outer tubular parts the inner of which has an inner annular end face, comprising, in combination, two annular concentric flange portions extending longitudinally from said end face in general parallel relationship and having an annular space therebetween, the outer flange portion being elastically deformable radially and having substantially uniform thickness throughout substantially its length, said outer flange portion having an axial length greater than its radial thickness but less than the axial length of the inner flange portion, and an annular bevelled seating surface formed on the inner wall of said outer tubular part to cooperate with said outer flange portion in such a manner that upon relative movement of said two tubular parts towards one another said seating surface engages said outer flange portion so as to bend the same elastically and radially inwards to thereby form a sealed joint.

5. Sealing arrangement for interfitting inner and outer tubular parts the inner of which has an annular inner end face, comprising, in combination, a first annular flange portion extending longitudinally from said end face and having its inner wall forming a continuation of the inner wall of said inner tubular part, a second and elastically deformable annular flange portion extending longitudinally from said end face and surrounding said first flange portion with an annular space therebetween, the outer wall of said second flange portion forming a continuation of the outer wall of said inner tubular part and said second flange portion having substantially uniform thickness throughout substantially its length and an axial length greater than its radial thickness but less than the axial length of said first flange portion, an annular bevelled surface formed on the inner wall of said outer tubular part, and an abutment surface extending radially inwards from said bevelled surface, said bevelled surface and said abutment surface cooperating respectively with said second and first flange portions in such a manner that upon relative movement of said inner and outer tubular parts towards one another said bevelled surface engages said second flange portion to bend the same elastically toward said first flange portion to thereby form a sealed joint, the radial distortion of said second flange portion being limited by mutual engagement of said first flange portion with said abutment surface.

6. A sealing arrangement for inner and outer members to be joined having adjacent tubular surfaces to be sealed comprising means for coupling the members together upon moving at least one of the members at least axially relative to the other, one member having mutually spaced longitudinally extending inner and outer flanges, the outer flange being elastically deformable and having substantially equal thickness throughout substantially its length, said outer flange being shorter and thinner than the inner flange, said inner flange having a terminal end defining a contact surface, means on the other member defining a beveled surface extending at an angle across the line of movement of the outer flange when the members are moved relatively to one another so as to engage the outer flange and bend the same toward the inner flange and means on said other member defining a contact surface complementary to the contact surface on the inner flange and engageable therewith to limit the relative axial movement so as to establish a predetermined deformation of the outer flange whereby when the one member is moved axially relative to the other, the outer flange is initially subjected to radial inward bending to an intermediate permanently deformed position sufficient to conform the concentricity of the same to that of the beveled surface and further axial movement to engage the contact surfaces subjects the outer flange to a further elastic deformation to form a sealed joint.

References Cited in the file of this patent

UNITED STATES PATENTS

| | | |
|---|---|---|
| 221,864 | Robbins | Nov. 18, 1879 |
| 798,507 | Hally | Aug. 29, 1905 |
| 1,389,542 | Wereley | Aug. 30, 1921 |
| 1,623,843 | Klinck | Apr. 5, 1927 |
| 1,913,246 | Saine | June 6, 1933 |
| 1,933,117 | Markle | Oct. 31, 1933 |
| 1,956,264 | Anderson | Apr. 24, 1934 |
| 2,155,491 | Jacobs | Apr. 25, 1939 |
| 2,171,217 | Kreidel | Aug. 29, 1939 |
| 2,488,566 | Sperry | Nov. 22, 1949 |
| 2,540,900 | McCool | Feb. 6, 1951 |